F. W. DOBBEL.
SAFETY LOCK FOR VEHICLES.
APPLICATION FILED DEC. 15, 1915.
1,211,925.
Patented Jan. 9, 1917.
3 SHEETS—SHEET 1.
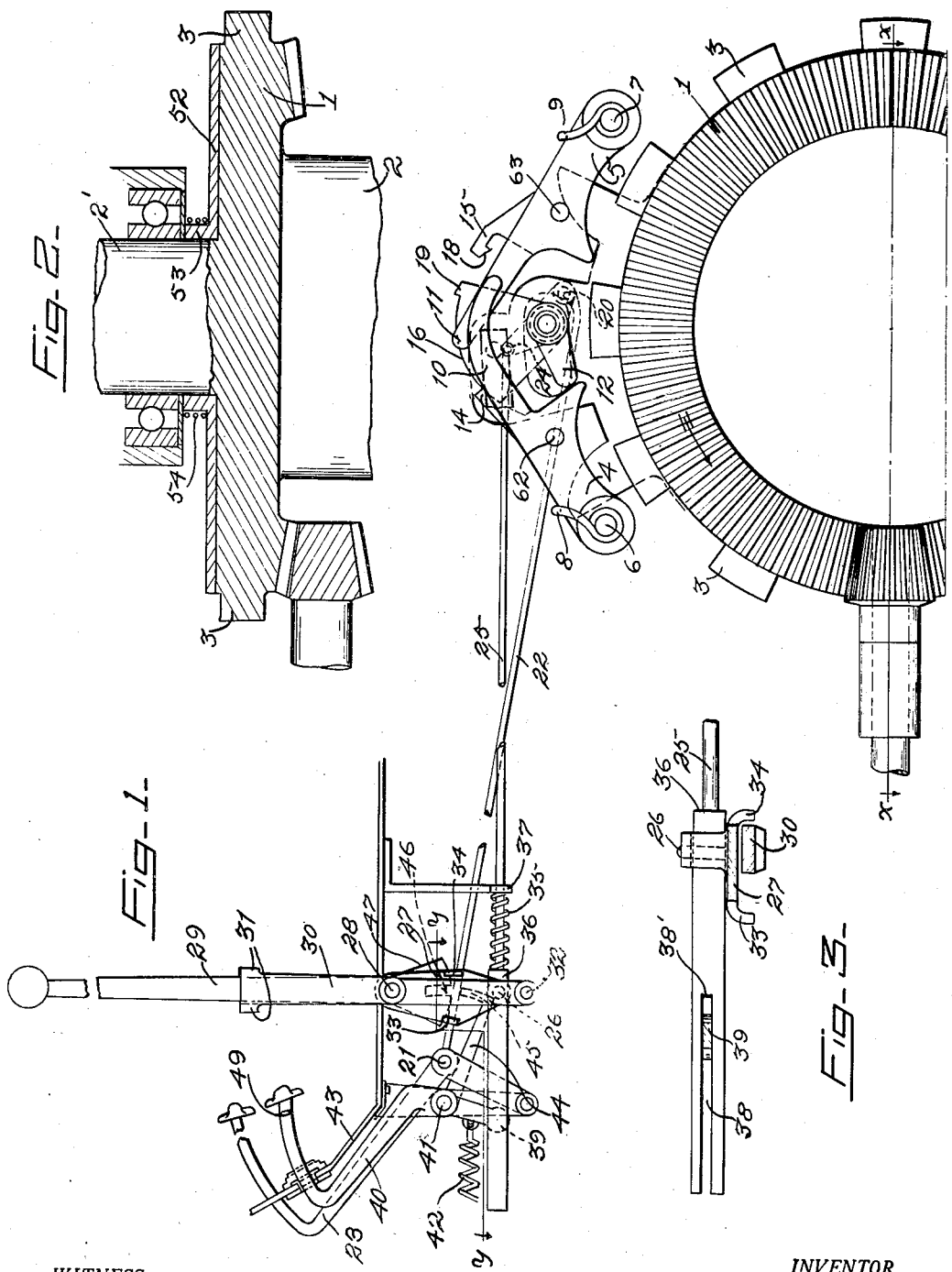
WITNESS
INVENTOR.
F. W. Dobbel
BY
his ATTORNEYS.

F. W. DOBBEL.
SAFETY LOCK FOR VEHICLES.
APPLICATION FILED DEC. 15, 1915.
1,211,925.
Patented Jan. 9, 1917.
3 SHEETS—SHEET 2.
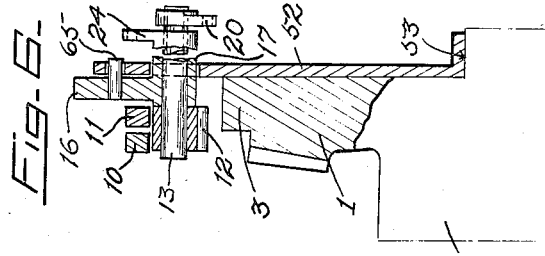
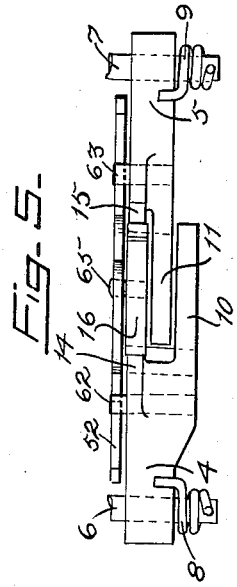
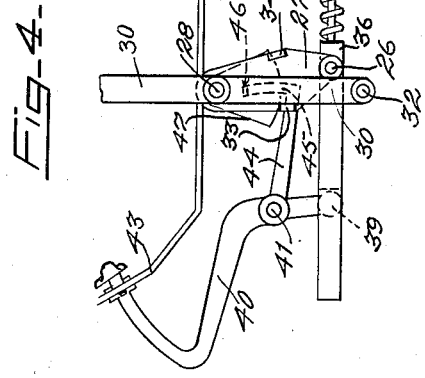
WITNESS
INVENTOR.
F. W. Dobbel
BY
Acker & Totten
his ATTORNEYS.

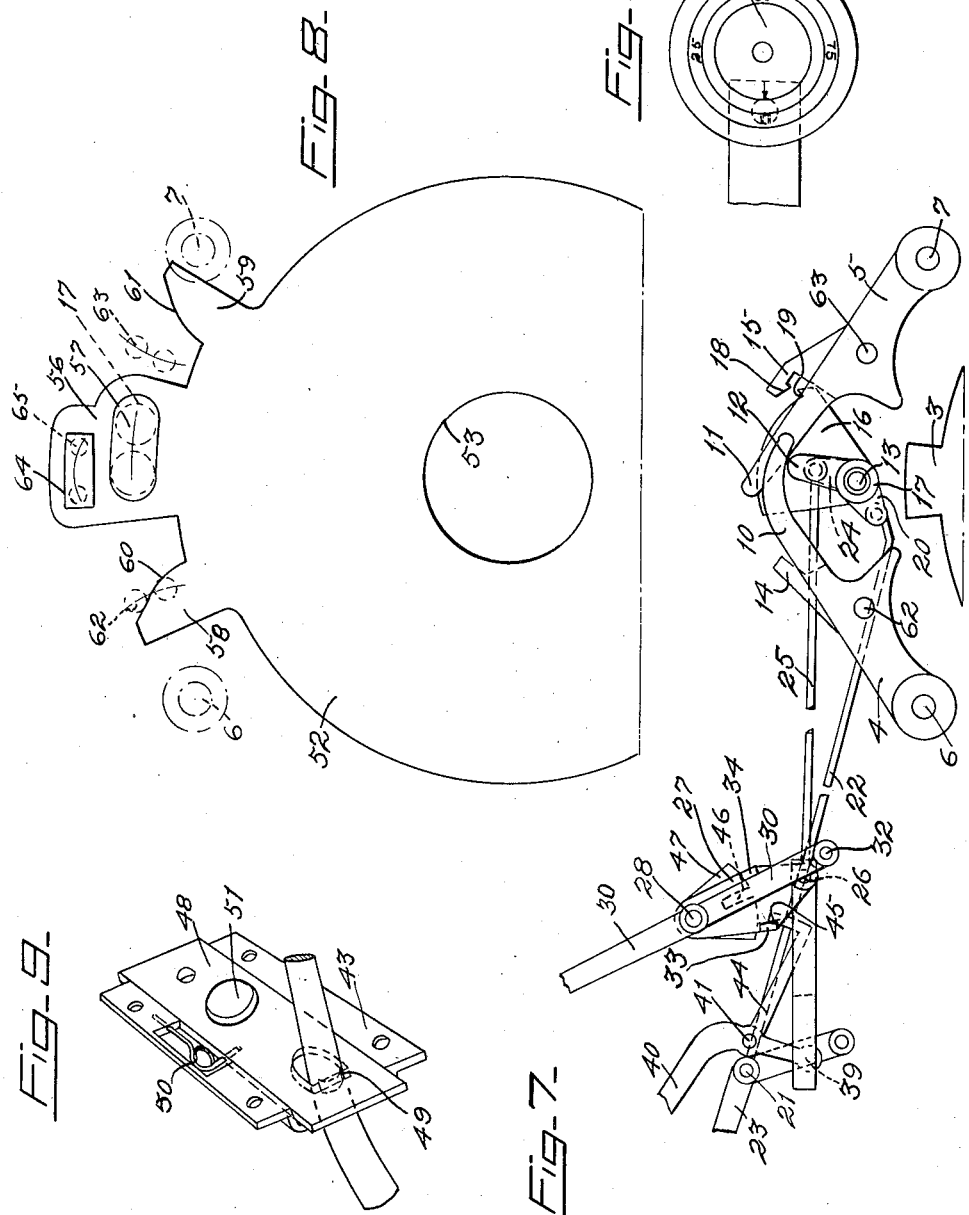

UNITED STATES PATENT OFFICE.

FREDERICK W. DOBBEL, OF SONOMA, CALIFORNIA, ASSIGNOR TO DOBBEL AUTO SAFETY LOCK COMPANY, OF SONOMA, CALIFORNIA, A CORPORATION OF CALIFORNIA.

SAFETY-LOCK FOR VEHICLES.

1,211,925.     Specification of Letters Patent.     Patented Jan. 9, 1917.

Application filed December 15, 1915. Serial No. 67,086.

*To all whom it may concern:*

Be it known that I, FREDERICK W. DOBBEL, a citizen of the United States, residing at Sonoma, in the county of Sonoma and State of California, have invented certain new and useful Improvements in Safety-Locks for Vehicles, of which the following is a specification.

The present invention relates to a safety lock for vehicles, and more particularly to an automatic stop and lock for automobiles and other motor vehicles.

The object of the invention is to provide means, interconnected with and principally operated by the usual control devices of the vehicle, which will automatically hold said vehicle against movement in a direction opposite to that for which it is set to move, and which may be operated, at will, to effectually lock the vehicle against movement in either direction, or to prevent the operation of the vehicle under its own power, while permitting it to be moved by power applied from without.

The advantages of the device will be apparent to anyone familiar with the use or operation of motor vehicles. When the vehicle is ascending a grade or incline, either forward or backward, it is automatically held against movement down the incline in case it should become stalled or come to a stop for any reason. Again, if the vehicle is left standing in any position, it can be locked in such a manner that its power transmitting mechanism cannot be thrown into operation by any unauthorized person, and the wheels are positively locked against movement in either direction. The wheel lock may be readily released, however, without unlocking the power transmitting mechanism, so that the vehicle may be moved by outside power, as, for example, when it is desired to move it from one place to another in a repair shop or garage.

In order to comprehend the invention, reference should be had to the accompanying sheets of drawings, in which—

Figure 1 is a side elevation of the device as applied to an automobile of usual construction, showing the parts in normal position as when the vehicle has been brought to a stop after forward movement. Fig. 2 is a sectional plan taken in the direction of the arrows on the line $x$—$x$ of Fig. 1. Fig. 3 is a sectional detail taken in the direction of the arrows on the line $y$—$y$ of Fig. 1. Fig. 4 is a side elevation, certain parts being omitted, showing the device in position for locking the vehicle against movement in both directions. Fig. 5 is a plan view of the pawls. Fig. 6 is a vertical section taken in the direction of the arrows, on the line $z$—$z$ of Fig. 4. Fig. 7 is a side elevation, certain parts being omitted, showing the selecting mechanism in position for reverse movement of the vehicle, and the pawls held out of engagement by the temporary release mechanism. Fig. 8 is a side elevation of the friction plate 52 of Figs. 1, 2, 4, 6 and 7. Fig. 9 is a perspective view, enlarged, of the lock mechanism. Fig. 10 is a front elevation, enlarged, of the preferred form of lock.

In the drawings, the numeral 1 represents a bevel driving gear carried in the usual manner by the housing 2 of an equalizing gear mounted upon the driving axle or sprocket countershaft 2', said equalizing gear and axle or countershaft being shown merely conventionally in Fig. 2 of the drawings, of a motor vehicle of the commonly known type. Carried about the periphery of the driving gear 1 is a series of spaced lugs or teeth 3, Figs. 1, 4 and 7 of the drawings, adapted to be engaged by a pair of oppositely disposed pawls 4 and 5, fulcrumed upon fixed pivots 6 and 7, and normally pressed into engagement with said teeth 3, as shown in Fig. 4 of the drawings, by springs 8 and 9.

The pawls 4 and 5 are respectively provided with overlapping arms or extensions 10 and 11, Figs. 1, 4, 5, 6 and 7 of the drawings, adapted to be engaged by a cam 12 mounted on a transverse rock-shaft 13, supported in suitable bearings, not shown in the drawings. It will be seen that partial rotation of the shaft 13, moving the cam 12 from the position shown in Fig. 4 to that shown in Fig. 7 of the drawings, causes the pawls 4 and 5, by the engagement of their extensions 10 and 11 with said cam 12, to be lifted out of engagement with the teeth 3.

The pawls 4 and 5 are further respectively provided with fingers 14 and 15, positioned beside and a little above the arms 10 and 11, and adapted to be engaged by a segmental cam 16, mounted upon a sleeve 17 surrounding and supported by, but not otherwise connected with, the transverse rock-shaft 13. When the segmental cam 16 is in its center position, as shown in Fig. 4 of the drawings, neither one of the fingers 14 and 15 is engaged thereby, and consequently, both pawls 4 and 5 may drop into engagement with the teeth 3. When said pawls are raised, however, by the cam 12, as in Fig. 7 of the drawings, the segmental cam 16 may be moved either forward, as shown in Fig. 1, or backward, as in Fig. 7 of the drawings, to pass under either the finger 14 of the pawl 4, or the finger 15 of the pawl 5, and to thus hold either one of said pawls out of engagement with the teeth 3 when the lifting cam 12 is returned to its lower or inoperative position. The finger 15 of the rear pawl 5 is provided with a hook 18, adapted to engage a shoulder 19 on the segmental supporting cam 16 to retain the same in its extreme rearward position, for a purpose hereinafter described.

The transverse rock-shaft 13 carries a lever 20, Figs. 6 and 7 of the drawings, which is connected at 21, by means of a rod 22, with the usual clutch-operating pedal-lever 23 of the vehicle, so that when said pedal 23 is depressed, the shaft 13 is rocked to move the lifting cam 12 from the position shown in Fig. 1 of the drawings, to that of Fig. 7, thereby raising both pawls 4 and 5 out of engagement with the teeth 3. It is understood that the pedal 23 also operates the main friction-clutch of the vehicle in the usual manner, but said clutch forms no part of the present invention and is not herein illustrated.

The rocking-sleeve 17, carrying the segmental supporting cam 16, is provided with a lever 24, Figs. 6 and 7 of the drawings, to which is connected a forwardly extending rod 25. Said rod 25 is pivotally connected at 26, Figs. 1, 3, 4 and 7 of the drawings, to a depending lever 27 fulcrumed at 28, which point is also the fulcrum of the usual gear-shifting lever of the vehicle. In the particular form illustrated, one of the commonly used systems of gear-shifting mechanism is shown, in which the selecting lever 29 may be rocked transversely of the vehicle, upon a pivot not shown in the drawings, to engage either one of a pair of oppositely disposed spaced shifting levers. In Fig. 1 of the drawings, for the purpose of illustration, only one of these shifting levers is shown, as at 30, and provided with spaced lugs 31 for engagement with opposite sides of said selecting lever 29. Said shifting lever 30 is connected at its lower end 32 by mechanism not illustrated, and forming no part of the present invention, with the usual power-transmitting gears in such manner that the lower end 32 of said lever 30 is moved to the rear, as in Fig. 7 of the drawings, to set said transmission gears in position for reverse operation of the vehicle, and to the front to provide for forward operation. The neutral position, in which no driving gears are in mesh, is shown in Fig. 1 of the drawings.

The lever 27, to which the rod 25 is connected, is provided with spaced lugs 33 and 34, adapted to engage either side of the gear-shifting lever 30, a certain amount of play being allowed between said lugs and said lever 30, as shown in Figs. 1, 3, 4 and 7 of the drawings.

A compression spring 35, Fig. 1 of the drawings, acting between a shoulder 36 on the rod 25 and a fixed supporting bracket 37, holds said rod as far forward as the lug 34 and the gear-shifting lever 30 will allow.

It will be seen that when the gear-shifting lever 30 is in its neutral position, as illustrated in Fig. 1 of the drawings, or in position for forward operation of the vehicle, that is with its lower end thrown forward, the rod 25 will be moved forward by the spring 35 to bring the segmental cam 16 under the finger 14 of the forward pawl 4 to hold said cam out of engagement with the teeth 3; and when said gear-shifting lever is moved into its reverse position, as shown in Fig. 7 of the drawings, the engagement of the lug 34 therewith will cause the lever 27, the rod 25, and the segmental cam 16 to be moved rearward, to bring said cam 16 under the finger 15 of the rear pawl 5, thereby holding the latter out of engagement with the teeth 3. The engagement of the hook 18 with the shoulder 19 on the cam 16 holds said cam in position against the compression of the spring 35, which would otherwise tend to force the gear-shifting lever 30 into its neutral position.

The rod 25 is extended forward from its connection 26 with the gear-shifting lever 27, and is provided with a vertical slot 38, Fig. 3 of the drawings, in which lies the lower end 39 of a safety pedal-lever 40, Figs. 1, 4 and 7 of the drawings, fulcrumed at 41 and held by a spring 42 in raised position to project through the foot-board 43 of the vehicle adjacent to the clutch pedal 23. When this safety-pedal 40 is depressed, as in Fig. 4 of the drawings, its lower end 39 abuts against the base 38' of the slot 38, and moves the rod 25 rearward to bring the segmental cam 16 into its center position, in which both pawls 4 and 5 are free to drop into engagement with the teeth 3.

The safety-pedal 40 carries an arm 44 provided with an up-turned end 45 adapted to enter a notch 46 in a segment 47 carried by the lower end of the selecting lever 29, so that when said safety-pedal 40 is depressed, as in Fig. 4 of the drawings, said selecting lever 29 is locked against fore and aft movement, and therefore no power-transmitting gears can be engaged. Furthermore, said safety-pedal 40 can be depressed only when said selecting lever is in neutral position, since in other positions thereof the finger 45 can not enter the notch 46, as shown in Fig. 7 of the drawings.

A latch plate 48, Fig. 9 of the drawings, is slidably mounted upon the foot-board 43 and adapted to engage a notch 49 in the stem of the safety-pedal 40 to hold said pedal in its depressed position. A spring 50 is provided to normally retain said latch plate 48 out of engagement with said pedal 40, and locking means, here shown in its preferred form as comprising a permutation lock 51, Figs. 9 and 10 of the drawings, is provided to hold said latch plate in locked position.

In order to prevent unnecessary noise and wear, means are provided for holding the operative pawl 4 or 5, depending on the direction of motion of the vehicle, out of engagement with the teeth 3 during the continuance of such motion, and to allow said pawl to engage said teeth immediately upon the reversal of the direction of said motion. A plate 52, Figs. 1, 2, 5, 6 and 8 of the drawings, is rotatably mounted at 53 upon the hub of the driving gear 1, and is pressed by a spring 54 into frictional contact with the back of said gear 1. Said plate 53 carries a slotted extension 56 at its upper portion, through the slot 57 of which pass the transverse rock-shaft 13 and its concentric sleeve 17. The rotation of the plate 52 is thus limited by the abutment of the ends of the slot 57 against said sleeve 17. On either side of said slotted extension 56 are a pair of spaced extensions 58 and 59, having inclined edges 60 and 61 respectively. The pawls 4 and 5 are respectively provided with laterally extending pins 62 and 63, Figs. 1, 4, 5, 7 and 8 of the drawings, adapted to engage said inclined edges 60 and 61 in such manner that when said plate is held at the rearward limit of its rotation by the reverse rotation of the driving gear 1, as shown in Figs. 7 and 8 of the drawings, the pin 62 of the pawl 4 is engaged by the inclined edge 60 of the extension 58 to hold said pawl 4 out of engagement with the teeth 3; and when said plate is held at the forward limit of its rotation, by the forward rotation of the driving gear 1, as in Fig. 1 of the drawings, the pawl 5 is similarly held out of engagement with the teeth 3, by means of its pin 63 and the extension 59. A second slot 64 is formed in the extension 56, in which operates a pin 65, Figs. 1, 4, 5, 6 and 8 of the drawings, extending from the segmental cam 16, said slot 64 and said pin 65 being so positioned relative to each other that movement of the segmental cam 16 from its forward position, as in Fig. 1 of the drawings, to its center position, as in Fig. 4 of the drawings, causes the plate 52 to move into its center position, in which neither of the pawls 4 and 5 is held up by the extensions 58 and 59.

The operation of the device may be briefly described as follows:—When the safety-pedal 40 and the clutch-pedal 23 are released, and the gear-shifting lever 30 is in neutral position, as shown in Fig. 1 of the drawings, or in any position for forward operation of the vehicle, the segmental cam 16 lies under the finger 14 of the forward pawl 4, and thereby holds said pawl 4 out of engagement with the teeth 3. As long as the vehicle moves forward, the plate 52 will remain at the forward limit of its movement, as in Fig. 1, and will hold the rear pawl 5 away from the teeth 3 by means of the co-acting extension 59 and pin 63. If the motion of the vehicle should be reversed, however, the plate 52 will rotate to back said extension 59 away from said pin 63, allowing the pawl 5 to drop into engagement with one of the teeth 3 to prevent the reverse rotation of the driving gear 1. Thus with the position of the parts as described, the vehicle is free to move forward, but is automatically locked against reverse motion. When it is desired, however, to reverse the motion of the vehicle, the usual operations of depressing the clutch pedal 23 and moving the gear lever 29 into reverse position are performed. By the depression of the clutch pedal 23, the cam 12 is operated to raise both pawls 4 and 5. The movement of the gear lever 29 into reverse position, as shown in Fig. 7 of the drawings, moves the segmental cam 16 under the finger 15 of the pawl 5, holding said pawl raised after the cam 12 is returned to its inoperative position by the release of the clutch pedal 23. Backward rotation of the driving gear 1 now actuates the plate 52 to hold the forward pawl 4 out of engagement, but immediately upon the reversal of said rotation, that is when the driving gear 1 begins to rotate forwardly, said pawl 4 is released by said plate 52 and allowed to engage one of the teeth 3. Thus when the vehicle is set for reverse or backward movement, it is automatically locked against forward movement. If the vehicle is to be left standing in an exposed place, as upon a road or street, or in a public garage, the gear-selecting lever 29 is first placed in neutral position, and the safety pedal 40 depressed and locked by the means described. This moves the segmental cam 16 into its center position, which movement by means of the pin 65 and the slot 64, also places the plate 52 in its center position, so that both pawls 4 and 5 drop into engagement with the teeth 3 of the driving gear 1 and hold it against rotation in either direction. At the same time the selecting lever 29 is locked by the finger 45 so that no power-transmitting gears can be engaged. If, however, it is desired to move the vehicle about by means of outside power, as when moving it from place to place in a garage or repair-shop, the clutch pedal 23 may be depressed, to raise both pawls 4 and 5 out of engagement with the driving gear 1, without unlocking the gear-lever 29. Thus the vehicle cannot be operated under its own power, nor readily stolen, but can be moved about if necessity so demands.

It will be seen that the clutch pedal 23 must be depressed before the gear-lever 29 can be operated to move the segmental cam 16 from its center position to either end position, or, on account of the hook 18, out of its reverse position. This constitutes an additional safeguard in the operation of the vehicle, in that it prevents the operation of the gear-lever to the extent described, without the releasing of the clutch. It will also be seen that when the gear-lever 29 is in any operative position, which is almost always the case while the vehicle is in motion, the safety pedal 40 cannot be depressed, and therefore the pawls 4 and 5 cannot be engaged with the teeth 3 while the driving gear 1 is rotating.

My invention has herein been illustrated and described in its preferred form, as applied to a motor-driven vehicle of the most common type as at present constructed. It is obvious, however, that the device may be applied to vehicles of other types, by the employment of such modifications as would readily suggest themselves to anyone familiar with the art. I therefore do not wish to be construed as limiting myself to the particular construction herein described, but on the contrary, I wish to claim the invention as broadly as the state of the art will permit.

Having thus described my invention, what I claim as new and desire to protect by Letters Patent is:—

1. A safety lock for wheeled vehicles comprising a member adapted to rotate with a road wheel of the vehicle, shiftable stop devices for interlocking therewith for positively holding the said member against rotation, and mechanism for automatically actuating said stop devices to engage with said member to prevent the rotation thereof in either direction.

2. A safety lock for wheeled vehicles comprising a member adapted to rotate with a road wheel of the vehicle, a pair of oppositely operating shiftable stop devices for interlocking therewith for positively holding said member against rotation, and mechanism for automatically actuating either one of said stop devices to engage with said member to prevent the rotation thereof in either direction, and means for operating both of said stop devices simultaneously to lock said wheel against any rotation.

3. A safety lock for wheeled vehicles comprising a toothed wheel mounted for rotation with a road wheel of the vehicle, oppositely operating pawls adapted to engage the teeth of said wheel, and mechanism for automatically actuating said pawls to lock said toothed wheel against rotation in either direction.

4. A safety lock for wheeled vehicles comprising a toothed wheel mounted for rotation with a road wheel of the vehicle, a pair of oppositely operating pawls adapted to engage the teeth of said wheel, selecting means for automatically actuating either one of said pawls to lock said toothed wheel respectively against rotation in either direction, and mechanism for actuating both of said pawls simultaneously to lock said wheel against any rotation.

5. A safety lock for wheeled vehicles comprising a toothed wheel mounted for rotation with a road wheel of the vehicle, a pair of oppositely operating pawls adapted to engage the teeth of said wheel to prevent the rotation thereof in either or both directions, selecting mechanism for automatically actuating either one of said pawls independently of the other, mechanism for actuating both of said pawls simultaneously, means for locking said actuating mechanism to retain said pawls in operative position, and devices independent of said locking means for temporarily rendering said pawls inoperative.

6. A safety lock for wheeled vehicles comprising a toothed wheel mounted for rotation with a road wheel of the vehicle, a pair of oppositely operating pawls adapted to engage the teeth of said wheel to prevent the rotation thereof in either or both directions, selecting mechanism for setting either one of said pawls in operative position independently of the other, devices associated with said toothed wheel and actuated by the rotation thereof to disengage said operative pawl therefrom during the continuance of said rotation, and to allow the same to engage upon the reversal of said rotation, and mechanism for actuating both of said pawls simultaneously to lock said wheel against any rotation.

7. A safety lock for wheeled vehicles comprising a member adapted to rotate with a road wheel of the vehicle, a pair of oppositely operating shiftable stop devices for inter-locking therewith for positively holding said member against rotation, selecting mechanism for setting either one of said stop devices in operative position independently of the other, devices associated with said rotating member and actuated by the rotation thereof to disengage said operative stop device therefrom during the continuance of said rotation, and to allow the same to engage upon the reversal of said rotation, and mechanism for actuating both of said stop devices simultaneously to throw the same into or out of positive engagement with said rotating member.

8. In a motor-driven wheeled vehicle having clutch-operating mechanism, a member mounted for rotation with a road wheel of the vehicle, stop devices associated therewith for preventing the rotation of said member in one direction, and means associated with the clutch-operating mechanism for rendering said stop devices inoperative.

9. In a motor-driven wheeled vehicle having clutch-operating mechanism, a member mounted for rotation with a road wheel of the vehicle, a pair of oppositely operating stop devices associated therewith for preventing the rotation of said member in either direction, selecting mechanism for setting either one of said stop devices in operative position independently of the other, and means associated with the clutch-operating mechanism for rendering said stop devices inoperative.

10. In a motor-driven wheeled vehicle having gear-shifting mechanism and clutch-operating mechanism, a member mounted for rotation with a road wheel of the vehicle, stop devices associated therewith for preventing the rotation of said member in one direction, means associated with the gear-shifting mechanism for controlling the operation of said stop devices according to the position of said gear-shifting mechanism, and means associated with the clutch-operating mechanism for rendering said stop devices inoperative.

11. In a motor-driven wheeled vehicle having gear-shifting mechanism and clutch-operating mechanism, a member mounted for rotation with a road wheel of the vehicle, a pair of oppositely operating stop devices associated therewith for preventing the rotation of said member in either direction, means associated with the gear-shifting mechanism and depending on the position thereof for setting either one of said stop devices in operative position, and means associated with the clutch-operating mechanism for rendering said stop devices inoperative.

12. In a motor-driven wheeled vehicle having gear-shifting mechanism and clutch-operating mechanism, a member mounted for rotation with a road wheel of the vehicle, a pair of oppositely operating stop devices associated therewith for preventing the rotation of said member in either direction, means associated with the gear-shifting mechanism and depending on the position thereof for setting either one of said stop devices in operative position, means associated with the clutch-operating mechanism for rendering said stop devices inoperative, and mechanism for engaging both of said stop devices with said rotating member to prevent any rotation thereof.

13. In a motor-driven wheeled vehicle having gear-shifting mechanism and clutch-operating mechanism, a toothed wheel mounted for rotation with a road wheel of the vehicle, a pair of oppositely operating pawls adapted to engage the teeth of said wheel to prevent rotation thereof, means associated with the gear-shifting mechanism and depending on the position thereof for setting either one of said pawls in operative position, mechanism for permitting the simultaneous engagement of both of said pawls with the teeth of said wheel, means for locking the last mentioned engaging mechanism in operative position, and means associated with the clutch-operating mechanism for disengaging said pawls from the teeth of said wheel.

14. In a motor-driven wheeled vehicle having gear-shifting mechanism and clutch-operating mechanism, a toothed wheel mounted for rotation with a road wheel of the vehicle, a pair of oppositely operating pawls adapted to engage the teeth of said wheel to prevent rotation thereof, means associated with the gear-shifting mechanism and depending on the position thereof for setting either one of said pawls in operative position, mechanism for permitting the simultaneous engagement of both of said pawls with the teeth of said wheel, and for interlocking with said gear-shifting mechanism to prevent operation thereof, and means associated with the clutch-operating mechanism for disengaging said pawls from the teeth of said wheel.

15. In a motor-driven wheeled vehicle having clutch operating mechanism, and gear-shifting mechanism, a member adapted to rotate with a road wheel of the vehicle, a shiftable stop device for interlocking therewith for positively holding said member against rotation in one direction, means associated with the gear-shifting mechanism for automatically setting said stop device in operative position, devices associated with said rotating member and actuated by the rotation thereof to disengage said stop device therefrom during the continuance of said rotation, and to allow the same to engage upon the reversal of said rotation, and means associated with the clutch-operating mechanism for throwing said stop device out of operative engagement with said rotatable member irrespective of said gear-shifting mechanism.

16. In a motor-driven wheeled vehicle having gear-shifting mechanism and clutch-operating mechanism, a member adapted to rotate with a road wheel of the vehicle, a pair of oppositely operating shiftable stop devices for interlocking therewith for positively holding said member against rotation, means associated with the gear-shifting mechanism for automatically setting either one of said stop devices in operative position independently of the other, and devices associated with said rotating member and actuated by the rotation thereof to disengage said operative stop device therefrom during the continuance of said rotation, and to allow the same to engage upon the reversal of said rotation.

17. In a motor driven wheeled vehicle having a gear-shifting mechanism and a clutch-operating mechanism, a toothed wheel mounted for rotation with a road wheel of the vehicle, a pair of oppositely operating pawls for engaging therewith to prevent the rotation thereof, means associated with the gear-shifting mechanism for automatically setting either one of said pawls in operative position independently of the other, devices associated with said toothed wheel and actuated by the rotation thereof to disengage said operative pawl therefrom during the continuance of said rotation, and to allow the same to engage upon the reversal of said rotation, means associated with the clutch-operating mechanism for disengaging both of said pawls from said toothed wheel, and mechanism for permitting the simultaneous engagement of both of said pawls therewith.

18. In a motor-driven wheeled vehicle having a driving axle, a toothed wheel carried thereby for rotation therewith, a pair of oppositely operating pawls adapted to engage the teeth of said wheel to prevent rotation thereof, selecting mechanism for setting either one of said pawls in operative position independently of the other, devices associated with said toothed wheel and actuated by the rotation thereof to hold said operative pawl out of engagement therewith during the continuance of said rotation, and to allow the same to engage upon the reversal of said rotation, and means for permitting the simultaneous engagement of both of said pawls with said toothed wheel.

19. In a motor-driven wheeled vehicle having a driving axle, a toothed wheel carried thereby for rotation therewith, a pair of oppositely operating pawls adapted to engage the teeth of said wheel to prevent rotation thereof, selecting mechanism for setting either one of said pawls in operative position independently of the other, a member mounted for oscillation about said axle and actuated by frictional contact with said toothed wheel to hold said operative pawl out of engagement therewith during the continuance of the rotation thereof and to allow the same to engage upon the reversal of said rotation, and means for permitting the simultaneous engagement of both of said pawls with said toothed wheel.

20. In a motor-driven wheeled vehicle having a driving axle and a driving gear thereon, a series of teeth carried by said gear, a pair of oppositely operating pawls adapted to engage said teeth to prevent rotation of said gear, selecting mechanism for setting either one of said pawls in operative position, and devices for permitting the simultaneous engagement of both of said pawls with said teeth.

21. In a motor-driven wheeled vehicle having a driving axle with a driving gear thereon, a series of teeth carried by said gear, a pair of oppositely operating pawls adapted to engage said teeth, and means for automatically setting either one of said pawls in operative position.

In testimony whereof I have signed my name to this specification in the presence of two subscribing witnesses.

FREDERICK W. DOBBEL.

Witnesses:
HARRY A. TOTTEN,
ADOLPH A. SYCHRONSTHY.